United States Patent [19]

Armbruster

[11] 4,370,155
[45] Jan. 25, 1983

[54] AIR CIRCULATING DEVICE

[76] Inventor: Joseph M. Armbruster, 2700 NE. 47th St., Lighthouse Point, Fla. 33064

[21] Appl. No.: 204,072

[22] Filed: Nov. 4, 1980

[51] Int. Cl.³ .................. B01D 50/00; F24F 13/06
[52] U.S. Cl. .................................. 55/316; 55/358; 55/385 A; 55/414; 55/419; 55/472; 55/482; 98/33 A; 98/38 D; 98/43 B
[58] Field of Search ............ 55/316, 356, 358, 385 A, 55/413, 414, 419, 472, 482, 528, DIG. 13; 422/120; 98/33 R, 33 A, 38 D, 43 B

[56] References Cited

U.S. PATENT DOCUMENTS

| | | | |
|---|---|---|---|
| 2,337,382 | 12/1943 | Frankland | 98/33 A |
| 2,886,124 | 5/1959 | Scharmer | 55/316 |
| 2,945,554 | 7/1960 | Berly | 55/316 |
| 3,008,402 | 11/1961 | Boulet | 98/33 R |
| 3,308,610 | 3/1967 | Springer et al. | 55/DIG. 13 |
| 3,347,025 | 10/1967 | Wiley | 98/33 A |
| 3,654,747 | 4/1972 | Remick | 55/316 |
| 3,687,053 | 8/1972 | Henson et al. | 98/33 R |
| 3,757,495 | 9/1973 | Sievers | 55/316 |
| 3,827,342 | 8/1974 | Hughes | 98/33 A |
| 3,850,598 | 11/1974 | Boehm | 98/33 A |
| 4,152,973 | 5/1979 | Peterson | 98/33 A |
| 4,194,945 | 3/1980 | Malev et al. | 55/528 |

Primary Examiner—David L. Lacey
Attorney, Agent, or Firm—Harvey B. Jacobson

[57] ABSTRACT

An air circulating device for providing a constant movement of air within the occupant zone of rooms which do not contain openable windows to allow natural air circulation during hot days. The air circulating device is provided in two forms, each form preferably situated in the corner of the room, the first form comprising a vertical air chamber with a first air inlet positioned adjacent the floor of the room and two air outlets positioned so that air forced from the vertical air chamber will flow outward in divergent paths along each of the walls forming a corner of the room, the inlet pulling in air diagonally from within the occupant zone of the room, providing complete air circulation. The second form of the air circulating device comprising top and bottom air inlets and a pair of air outlets in which air is forced through the outlets in divergent paths diagonally into the occupant zone of the room, the top and bottom inlets and spaced outlets are spaced intermediate the floor and ceiling of the room. In both forms of the air circulating device, the inlet is provided with a double filter in which the first stage comprises a washable synthetic filter for removing particulate material from the air, the second stage comprising an activated carbon filter which is replaceable and which removes smoke and other odors from the air.

13 Claims, 7 Drawing Figures

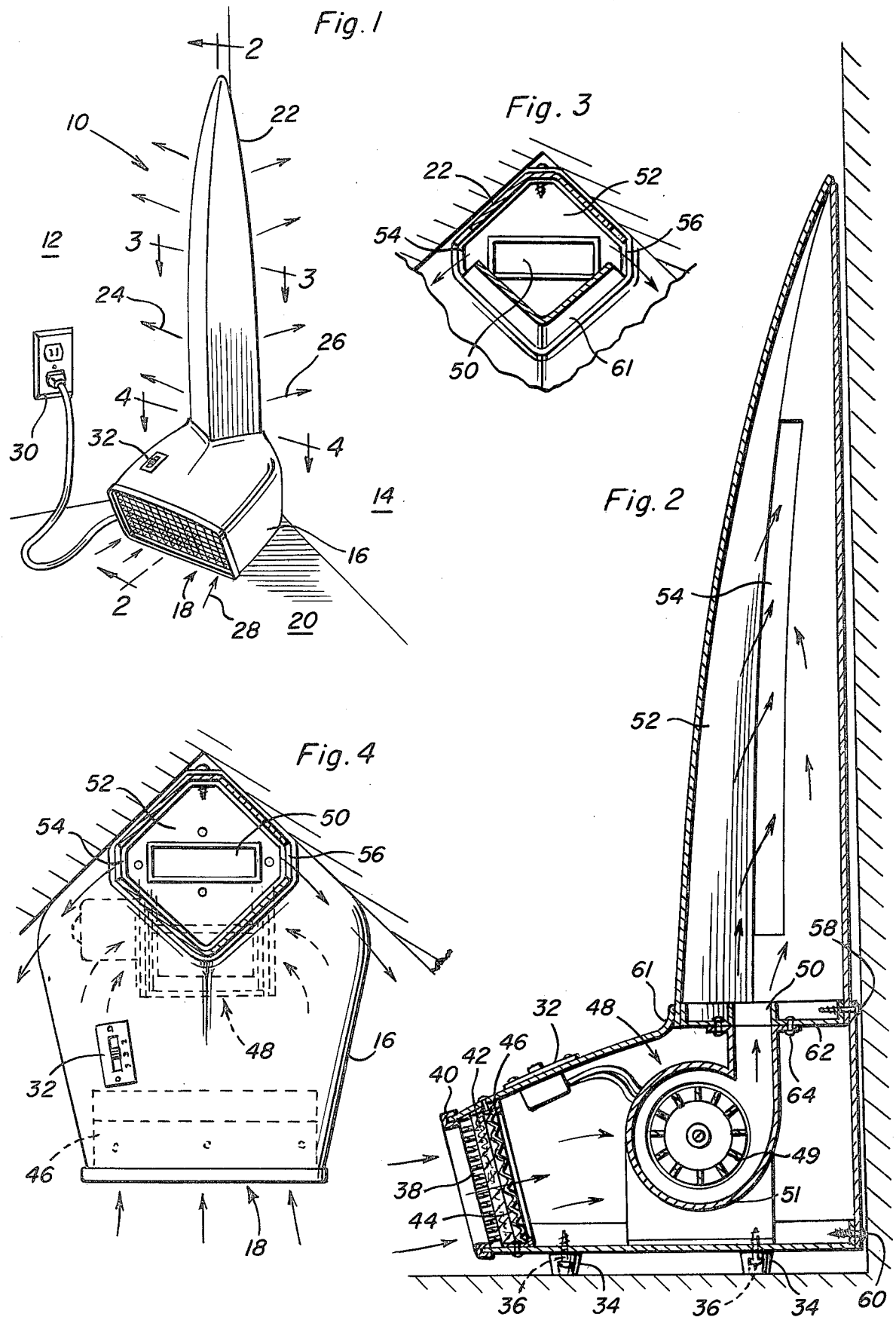

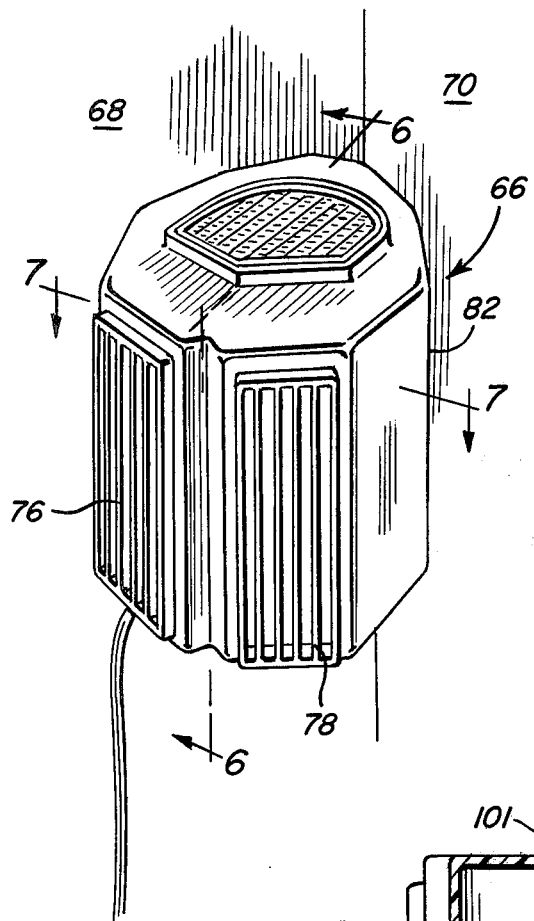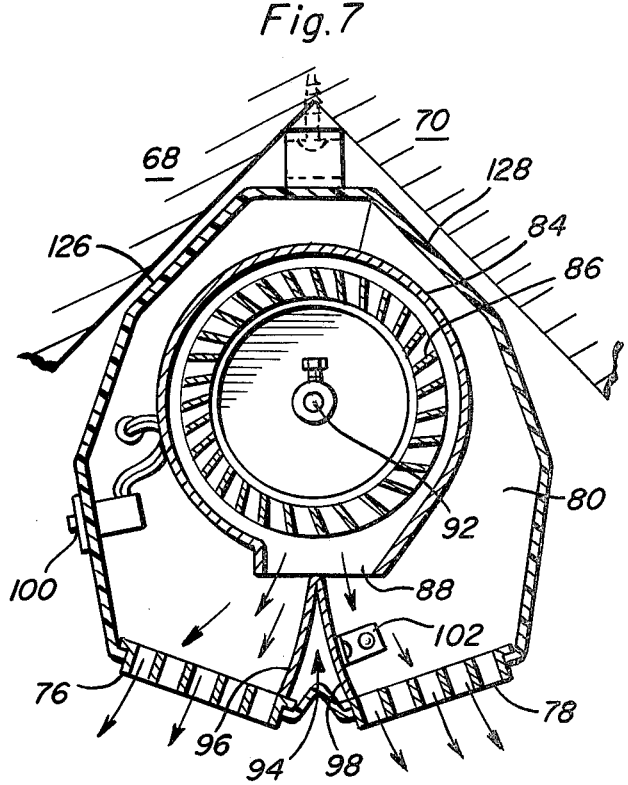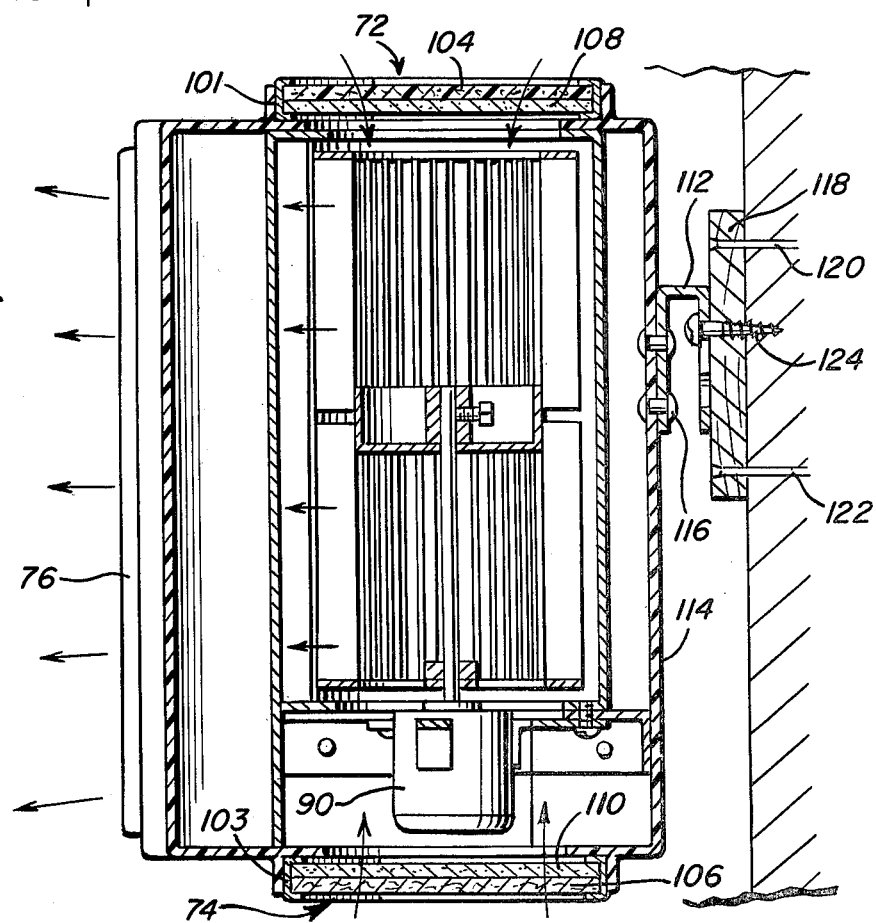

AIR CIRCULATING DEVICE

BACKGROUND OF THE INVENTION

This invention relates to an air circulating device and, more particularly, to a device which will provide air circulation throughout the full occupant zone of a room, producing a chill factor which provides a comfortable environment in very warm rooms with no natural air circulation.

The majority of commercial buildings constructed in the last 15 years have not incorporated windows which open to provide circulation of outside air for cooling, such buildings relying solely upon separate air conditioning units or central air conditioning powered by an external energy source such as electricity or natural gas. However, an effect of the ever increasing costs of operating such air conditioning devices has been that thermostats utilized to control the operation of the air conditioning device and thus the temperature of occupant zones within the building have been set at 75° F. to 80° F. in order to reduce operating costs, and without air circulation from an open window, such occupant zones or rooms become quite unbearable when the outside temperature is over 80° F. While individual fan units are helpful to provide air circulation within small areas of the occupant zone, such circulating units do not provide circulation throughout the full space of the occupant zone. Only when a plurality of units are used is full air circulation provided. The use of a plurality of fan units, however, does not reduce energy costs.

The following is a list of patents which disclose devices for providing air circulation for heating or cooling a room, cool air and warm air temperature equalization and ventilation for removing irritants from the air:

- U.S. Pat. No. 2,635,524—Apr. 21, 1953—Jenkins
- U.S. Pat. No. 3,173,353—Mar. 16, 1965—Watkins
- U.S. Pat. No. 3,347,025—Oct. 17, 1967—Wiley
- U.S. Pat. No. 3,802,168—Apr. 9, 1974—Deckas
- U.S. Pat. No. 3,827,342—Aug. 6, 1974—Hughes
- U.S. Pat. No. 3,973,479—Aug. 10, 1976—Whiteley
- U.S. Pat. No. 4,064,203—Dec. 20, 1977—Cox
- U.S. Pat. No. 4,102,597—July 25, 1978—Itayama
- U.S. Pat. No. 4,136,606—Jan. 30, 1979—Wolbrink
- U.S. Pat. No. 4,152,973—May 8, 1979—Peterson.

The air circulating device of the present invention includes a pair of spaced forced air outlets which direct air in two divergent paths combined with a novel inlet air filter system. The air circulating device provides air circulation throughout the total area of the occupant zone of a room, especially when the air circulating device is positioned in a corner of a room, and substantially eliminates all air borne irritants. None of the above mentioned patents disclose an air circulating device which when placed in a corner of a room can provide air circulation throughout the total area of a room nor do such patents disclose the combined filter system of the present invention for removing air borne irritants.

There is a need, therefore, for an air circulating device which can be used in place of present air conditioning systems and which is capable of providing comfort to occupants of rooms with little or no circulation of air from the outside environment.

SUMMARY OF THE INVENTION

Briefly, the air circulating device of the present invention is provided in two forms, in which the first form includes an air inlet adjacent the floor of a room and includes a blower to force the incoming air into a vertical air chamber and out through a pair of spaced elongated vertical outlets in the air chamber, the outlets being spaced from each other by 180°, the air circulating device preferably being situated in a corner of the room in which the outlets direct air against and across the respective walls forming the corner, the inlet drawing air diagonally from across the occupant zone of the room, providing air circulation throughout the total area of the room. The second form of the invention includes a top and bottom inlet positioned intermediate the floor and ceiling of the room and a pair of spaced outlets directing air into the room in diverging flow paths, the second form also preferably situated in the corner of a room in which outlet air is forced out on either side of the diagonal center of the room. In both forms of the invention, inlet air is filtered by a novel filter system including a first washable synthetic filter and a second activated charcoal filter which can be removed and replaced to maintain efficient filtering of air borne irritants. The first form of the air circulating device can be free standing while the second form is wall-mounted, though both forms may be incorporated directly within the wall construction, such as between adjacent studs or actually formed as an integral part of a central air conditioning system.

It is an object of the present invention to provide an air circulating device of the type described above having greatly improved efficiency so as to insure low energy consumption in its use and provide circulation of air throughout the total area of the room in which it is placed.

Another object of the invention is to provide an air circulating device which will provide air circulation throughout the total area of a room and substantially reduce air borne irritants, such as dust, smoke, and other odors.

Still another object of the invention is to provide air circulation throughout the total area of a room in which outside air is unable to enter to provide natural air circulation, the air circulation producing a chill factor in the room making the room comfortable for occupants when the outside temperature becomes quite high, such as over 80° F.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating one embodiment of the air circulating device of the present invention.

FIG. 2 is a longitudinal sectional view of the air circulating device of FIG. 1 taken generally along line 2—2 of FIG. 1.

FIG. 3 is a transverse sectional view illustrating the structure of the vertical air chamber taken generally along the line 3—3 of FIG. 1.

FIG. 4 is a transverse sectional view illustrating the entranceinto the vertical air chamber from the inlet adjacent the floor of the room taken generally along the line 4—4 of FIG. 1.

FIG. 5 is a perspective view illustrating an alternative embodiment of the air circulating device of the present invention.

FIG. 6 is a cross-sectional view of the alternative air circulating device taken generally along the line 6—6 of FIG. 5.

FIG. 7 is a transverse view taken generally along the line 7—7 of FIG. 5.

DETAILED DESCRIPTION OF THE INVENTION

Referring to FIG. 1, air circulating device 10 is a free standing unit positioned in a room including a corner formed by side walls 12 and 14. Air circulating device 10 comprises a base 16 forming the bottom portion of device 10 and containing inlet 18 positioned so as to receive air flowing parallel and adjacent to floor 20. Positioned over base 16 is casing 22 enclosing a vertical air chamber in which outlet air passes into the room in two divergent directions, against and across side walls 12 and 14, as indicated by the reference arrows, such as arrow 24 and 26, respectively. Air from the center of the room is drawn into inlet 18 as represented by arrow 28. Free standing air circulating device 10 includes a blower which is operated by an electric current from outlet 30 and includes a variable speed switch 32 to control operation of the blower which is illustrated in FIG. 2.

Referring now to FIGS. 2 through 4, it can be seen that base 16 is supported adjacent the floor by pedestals 34 secured to the base by fastening screws 36, elevating device 10 slightly above floor 20. Provided in inlet 18 is grille 38 held in place by frame 40. Behind grille 38 is placed the novel air filtering system incorporated in both forms of the air circulating device of the present invention. In air circulating device 10, filter 42, formed of synthetic resin fibers, such as polyester fibers, is placed directly behind grille 38. Filter 44 is an activated charcoal filter positioned behind synthetic fiber filter 42. Both filters, synthetic fiber filter 42 and activated charcoal filter 44 are positioned in base 16 adjacent air inlet 18 by frame 46. Both filters are removable, filter 42 being washable to remove the collected particulate material therefrom, activated charcoal filter 44 is not renewable but can be easily replaced with a fresh activated charcoal filter. Further contained within the base 16 is a single electric air blower assembly 48 comprising impeller 49 positioned within an enclosed blower housing 51 and which draws air from the occupant zone of the room into inlet 18 and discharges air through vertical outlet 50 provided in the housing 51. Outlet 50 is positioned contiguous with vertical air chamber 52 and discharges air upwardly and directly into vertical air chamber 52 formed by casing 22, the flow path of air through inlet 18 and through outlet 50 into air chamber 52 being indicated by the reference arrows. Placed on opposite sides of air chamber 52 at an angle of approximately 180° are a pair of vertical elongated slots 54 and 56 through which air forced into vertical air chamber 52 can exit in a substantially horizontal flow path providing air circulation throughout the room in which air circulating device 10 is situated. Slots 54 and 56 extend from above base 16 to a position intermediate floor 20 and the ceiling of the room. The length of each slot 54 and 56 varies depending upon the vertical length of air chamber 52. Casing 22 is easily fastened to base 16 by means of screws 58 and 60 and further supported by lip 61 in base 16. Blower outlet 50 is securely fastened to flange 62 of base 16 via fastening means such as screws or rivets 64.

Air circulating device 10 provides circulation of air throughout the total area of the occupant zone of a room in the following manner. Preferably, air circulating device 10 is situated in a corner of the room, such as formed by side walls 12 and 14, and such that slots 54 and 56 will direct forced air against and along the respective side walls forming the corner. Referring to FIGS. 1 and 4, air flowing from slots 54 and 56 travels substantially parallel with and down immediate adjoining walls 12 and 14, respectively, and then bounces off and follows the corresponding walls (not shown) adjacent side walls 12 and 14, but spaced from the corner formed thereby. Return air is pulled diagonally across the room from adjacent the corner opposite the corner formed by walls 12 and 14 and the center of the room, thereby creating near total air circulation in the room.

In FIG. 5, a second form of the invention is illustrated and generally indicated by reference numeral 66, also preferably situated in a corner defined by side walls 68 and 70. Air circulating device 66 is mounted in the corner intermediate the floor and ceiling of a room. Referring to FIGS. 5 through 7, air circulating device 66 contains two inlets, upwardly facing top inlet 72 and downwardly facing bottom inlet 74, and a pair of spaced grilles 76 and 78 positioned intermediate inlets 72 and 74 and directing forced air substantially horizontally into the occupant zone of the room in two diverging directions. Grilles 76 and 78 have grille openings which enable forced air to exit from within air chamber 80 formed by casing 82, the direction of air flow being indicated by the reference arrows. The forced air is produced by a conventional squirrel cage blower equivalent to blower assembly 48, including a housing 84 which encloses impeller 86 and includes outlet 88 having its opening oriented in a substantially vertical plane. Impeller 86 is driven by an electric variable speed motor 90 which rotates impeller shaft 92. Air leaving blower outlet 88 is directed into each of grilles 76 and 78 by means of baffle 94 positioned between outlet 88 and outlets 76 and 78. Baffle 94 is positioned adjacent the center of outlet 88 and comprises a pair of divergent air directing members 96 and 98 to separate the air flow from outlet 88 immediately into two paths and directing the separated air flow to the individual circulating device grilles 76 and 78, respectively. Motor 90 is preferably a variable speed motor operated by switch 100 which controls the volume and pressure of air directed toward baffle 94 and into grilles 76 and 78. Baffle 94 is fastened to air circulating device 66 by means of corner bracket 102.

As in the case of air circulating device 10, inlets 72 and 74 of air circulating device 66 include a dual filter system comprising a forward synthetic resin filter 104 and 106 for inlets 72 and 74, respectively, and a rear activated carbon filter 108 and 110 situated in inlets 72 and 74, respectively. Filters 104 and 106 are preferably synthetic resin fiber or foam filters and are easily washable. Activated charcoal filters 108 and 110 can be replaced with a new clean activated charcoal filter once the old filters are no longer operating at acceptable efficiency. The filtering system substantially reduces particulates in the air, such as smoke and dust and other air bone irritants, increasing the freshness of the air circulating and contained within the room within which air circulating device 66 is placed. Top and bottom filters are positioned within frame members 101 and 103, respectively.

Air circulating device 66 is preferably a wall mounted unit in which a mounting flange 112 is fastened to rear wall 114 of casing 82 by a pair of rivets 116 and to wall support 118 and to the corner formed by walls 68 and 70 by means of screws 120, 122 and 124.

For the most efficient use of air circulating device 66, the device is placed in a corner formed by a pair of walls such as walls 68 and 70 illustrated in FIGS. 5 and 7. Casing 82 includes side walls 126 and 128 angled so as to fit in the corner formed by walls 68 and 70. Grilles 76 and 78 direct forced air on each side of a diagonal extending outwardly from the corner formed by walls 68 and 70 to an opposite corner (not shown) of the room in which air circulating device 66 is placed. Air drawn from the ceiling area of the room through inlet 72 and air drawn in from the floor of the room through inlet 74 as well as air drawn adjacent and across walls 68 and 70 due to the pressurized air flow at the center of the room formed by air passing through grilles 76 and 78 provides circulation of air throughout substantially the total area of the room.

In both forms of the present invention, air circulating devices 10 and 66, the motor and associated blower are fully enclosed within a housing and is thereby protected from being damaged. The enclosed blower assemblies also eliminates the hazards of persons in the room being injured since it isnot possible for hands to come in contact with the impeller blades of the blower. Likewise, the noise level of the motor is greatly reduced in view of the housing which totally surrounds and encloses the blower motor assemblies. By utilizing either of air circulating devices 10 or 66 in rooms which do not include openable windows, a circulation of air can be produced forming a slight chill factor in the occupant zone of the room, thus making occupants more comfortable during very hot days and when air conditioning units must be set at higher temperatures in order to reduce the cost of energy of operating air conditioning systems.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An air circulating device for providing circulation of air throughout substantially the total area of a room, comprising: a hollow base forming the bottom portion of said device and capable of supporting said device adjacent to the floor of a room, an air inlet means formed in said base and capable of receiving air flowing parallel and adjacent to the floor, a single blower assembly contained within said base and including an impeller enclosed within a blower housing, said blower housing including a blower outlet, a casing comprising an elongated vertical air chamber disposed over said hollow base, first and second elongated vertical air outlets placed in said casing and positioned and arranged on opposite sides of said casing so as to provide at least two divergent substantially horizontal airflow paths, said blower outlet being orientated upwardly into said air chamber and being contiguous therewith, whereby forced air is discharged from said air chamber into said at least two divergent substantially horizontal paths directly from said air outlets into a room.

2. The device of claim 1 wherein said device includes a filter means to remove air borne particulate material and odors from the air; said filter means positioned within said base adjacent to said air inlet means.

3. The device of claim 2 wherein said filter means comprises a pair of juxtaposed filters, one of said filters being washable, the other of said filters comprising an activated charcoal filter.

4. The device of claim 3 wherein said washable filter is formed from a synthetic resin.

5. The device of claim 4 wherein said synthetic resin filter is formed from synthetic fibers or synthetic foam.

6. The device of claim 1 wherein said outlets are spaced approximately 180° from each other.

7. An air circulating device for providing circulation of air throughout substantially the total area of a room, comprising: a casing comprising an enclosed air chamber, a first upwardly facing top air inlet, a second downwardly facing bottom air inlet, a single blower assembly positioned within said air chamber intermediate said top and bottom air inlets, said blower assembly including an impeller enclosed within a blower housing, said blower housing including a horizontally directed blower outlet, first and second air outlets placed in said casing intermediate said top and bottom air inlets, said first and second air outlets being positioned adjacent to each other although facing horizontally in at least two divergent directions, a baffle interposed between said blower outlet and each of said first and second air outlets whereby forced air discharged from said blower outlet is immediately separated and directed to each of said first and second air outlets.

8. The device of claim 1 further including grille means positioned in said first and second air outlets.

9. The device of claim 7 including a mounting means positioned on an exterior portion of said casing opposite said first and second outlets.

10. The device of claim 7 wherein said device includes a first and second filter means to remove air borne particulate material and odors from the air, said first and second filter means positioned within said top and bottom air inlets, respectively.

11. The device of claim 10 wherein each of said first and second filter means comprises a pair of juxtaposed filters, one of said filters being washable, the other of said filters comprising an activated charcoal filter.

12. The device of claim 11 wherein said washable filter is formed from a synthetic resin.

13. The device of claim 12 wherein said synthetic resin filter is formed from synthetic fibers or synthetic foam.

* * * * *